US012502661B2

(12) United States Patent
Qian et al.

(10) Patent No.: US 12,502,661 B2
(45) Date of Patent: Dec. 23, 2025

(54) CATALYSTS FOR SYNTHESIZING CYCLIC CARBONATES, PREPARATION METHODS AND USES THEREOF

(71) Applicant: Anhui Conch Material Technology Co., Ltd., Wuhu (CN)

(72) Inventors: Shanshan Qian, Wuhu (CN); Feng Ding, Wuhu (CN); Feng Jin, Wuhu (CN); Feng Chen, Wuhu (CN); Jinying Peng, Wuhu (CN); Xiqing Zhang, Wuhu (CN)

(73) Assignee: ANHUI CONCH MATERIAL TECHNOLOGY CO., LTD., Wuhu (CN)

( * ) Notice: Subject to any disclaimer, the term of this patent is extended or adjusted under 35 U.S.C. 154(b) by 0 days.

(21) Appl. No.: 18/809,602

(22) Filed: Aug. 20, 2024

(65) Prior Publication Data

US 2025/0352989 A1 Nov. 20, 2025

(30) Foreign Application Priority Data

May 16, 2024 (CN) ......................... 202410607160.6

(51) Int. Cl.

*B01J 37/08* (2006.01)
*B01D 3/10* (2006.01)
*B01J 31/18* (2006.01)
*B01J 31/22* (2006.01)
*B01J 37/04* (2006.01)
*C07D 317/38* (2006.01)

(52) U.S. Cl.

CPC ............ *B01J 31/2217* (2013.01); *B01D 3/10* (2013.01); *B01J 31/1825* (2013.01); *B01J 37/04* (2013.01); *B01J 37/08* (2013.01); *C07D 317/38* (2013.01); *B01J 2231/4288* (2013.01); *B01J 2531/0213* (2013.01); *B01J 2531/0238* (2013.01); *B01J 2531/22* (2013.01); *B01J 2531/23* (2013.01); *B01J 2531/26* (2013.01); *B01J 2531/31* (2013.01); *B01J 2531/62* (2013.01); *B01J 2531/72* (2013.01); *B01J 2531/842* (2013.01); *B01J 2531/845* (2013.01); *B01J 2531/847* (2013.01)

(58) Field of Classification Search

CPC .................................................... B01J 31/2217

See application file for complete search history.

(56) References Cited

PUBLICATIONS

Darensbourg, Macromolecules (Washington, DC, United States) (2010), 43(14), 5996-6003.*
Castro-Osma, Abstract, ACS Catal. 2016, 6, 5012-5025.*
Castro-Osma, Unprecedented Carbonato Intermediates in Cyclic Carbonate Synthesis Catalysed by Bimetallic Aluminium(Salen) Complexes, ChemSusChem (2016), 9(8), 791-794.*
Shaw, Asymmetric Catalysis Using Chiral Salen-Metal Complexes: Recent Advances Chem. Rev. 2019, 119, 9381-9426.*

* cited by examiner

*Primary Examiner* — Nizal S Chandrakumar
(74) *Attorney, Agent, or Firm* — MUNCY, GEISSLER, OLDS & LOWE, P.C.

(57) ABSTRACT

The present invention provides a catalyst for synthesizing a cyclic carbonate and a preparation method and use thereof. A diamine compound X, a salicylaldehyde-containing compound and a metal source M are subjected to reaction, and then added with a phenothiazine compound Y for continuous reaction to obtain a phenothiazine metal Schiff base catalyst. The formation of phenothiazine free radicals by phenothiazine compounds with a central metal can protect the central metal in the course of reaction and inhibit inactivation caused by the self-polymerization of the central meta, thus improving the activity and stability of a catalyst. Phenothiazine compounds can be present as a polymerization inhibitor to inhibit the generation of by-products such as polycarbonates and polyethylene glycol and enhance the selectivity of the catalyst during the reaction. The phenothiazine compounds are alkaline and can adsorb and activate carbon dioxide during reaction, which helps to improve the reaction efficiency. The phenothiazine metal Schiff base catalyst prepared in the present invention has high activity, strong stability and good selectivity and thus, can achieve the efficient catalyzed synthesis of cyclic carbonates under mild conditions.

9 Claims, No Drawings

CATALYSTS FOR SYNTHESIZING CYCLIC CARBONATES, PREPARATION METHODS AND USES THEREOF

FIELD OF TECHNOLOGY

The present invention belongs to the technical field of cyclic carbonate synthesis and catalysts, and particularly relates to a catalyst for synthesizing a cyclic carbonate, a preparation method and use thereof; the catalyst is a phenothiazine metal Schiff base catalyst and can catalyze the reaction between carbon dioxide and an epoxide to synthesize the cyclic carbonate.

BACKGROUND

With the continuous development of the current society and ever-growing carbon dioxide emissions, the problem of "greenhouse effect" has been increasingly aggravated. How to efficiently develop and utilize carbon dioxide to achieve the fixed transformation of carbon dioxide has become a research topic widely concerned by global researchers at present.

Cyclic carbonate is an important organic synthetic intermediate and has been extensively applied in the fields such as chemical engineering, medical treatment, battery electrolyte and plastics. Currently, one of the important ways to carbon dioxide development is to transform epoxides and carbon dioxide into high valued cyclic carbonates. The technology features no generation of by-products, has an atom utilization efficiency of being up to 100% and conforms to the new modern concept of chemical industry of low carbon and environmental protection, energy conservation and emission reduction to achieve the fixed high valued transformation of carbon dioxide and thus, has significant economic benefits and social benefits.

The core of the cyclic carbonate synthetic technology via the reaction of carbon dioxide and epoxide lies in the development of catalysts; the metal Schiff base complex is a kind of excellent-performance catalyst for synthesizing a cyclic carbonate and is highly favored by domestic and foreign researchers.

In the current studies on the catalyst of metal Schiff base complex, there also exist some problems and challenges urgently need to be solved, thus affecting its further development and utilization. The most crucial problem is that Lewis acidic metal center of the metal Schiff base complex is prone to be self-polymerized to form an oxo-bridged dimer during the catalytic reaction; the formation of the self-polymer will inactivate its active components, thereby resulting in declined activity and stability of the catalyst.

Therefore, it is very necessary to provide a high-activity and strong-stability catalyst for synthesizing a cyclic carbonate.

SUMMARY

The objective of the present invention is to provide a catalyst for synthesizing a cyclic carbonate, a preparation method and use thereof; the phenothiazine metal Schiff base catalyst provided in the present invention can resist the self-polymerization of the active center and can catalyze the reaction of carbon dioxide and an epoxide to synthesize the cyclic carbonate under relatively mild conditions. Moreover, the present invention is to solve the problem, i.e., Lewis acidic metal center of the metal Schiff base complex is prone to be self-polymerized to form an oxo-bridged dimer during the catalytic reaction; the formation of the self-polymer will inactivate its active components, thereby resulting in declined activity and stability of the catalyst.

A further objective of the present invention is to provide use of the catalyst for synthesizing a cyclic carbonate in catalyzing carbon dioxide and an epoxide to synthesize a cyclic carbonate. Furthermore, the present invention can achieve efficient catalysis under mild conditions, and has high activity, good selectivity, and strong stability.

The present invention has the following specific technical solution:

The present invention provides a catalyst for synthesizing a cyclic carbonate, having a structural formula of:

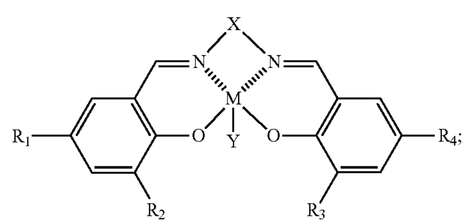

in the formula, M is a metal ion, and preferably, M is a combination of one or more of $Al^{3+}$, $Zn^{2+}$, $Fe^{3+}$, $Co^{2+}$, $Mn^{2+}$, $Ni^{2+}$, $Mg^{2+}$, $Cr^{3+}$, or $Ca^{2+}$;

X is one of the following structures:

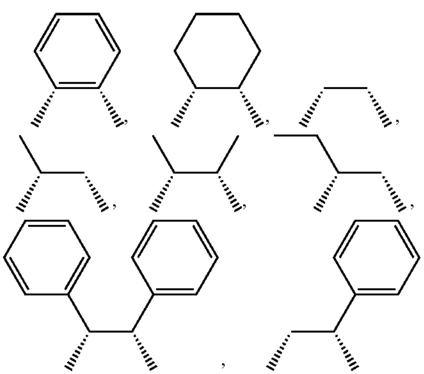

Y is a phenothiazine structure, and preferably, Y is one or more of the following structural formulas:

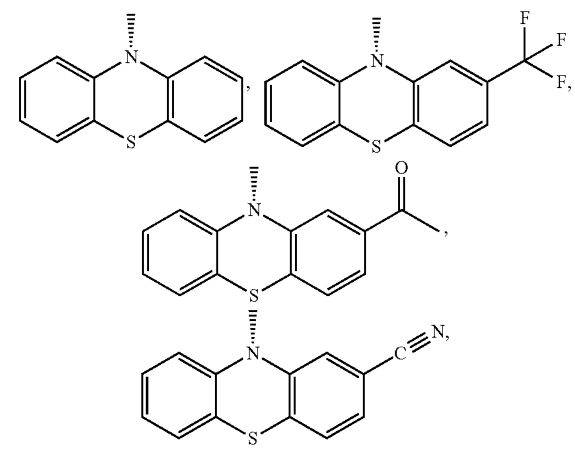

-continued

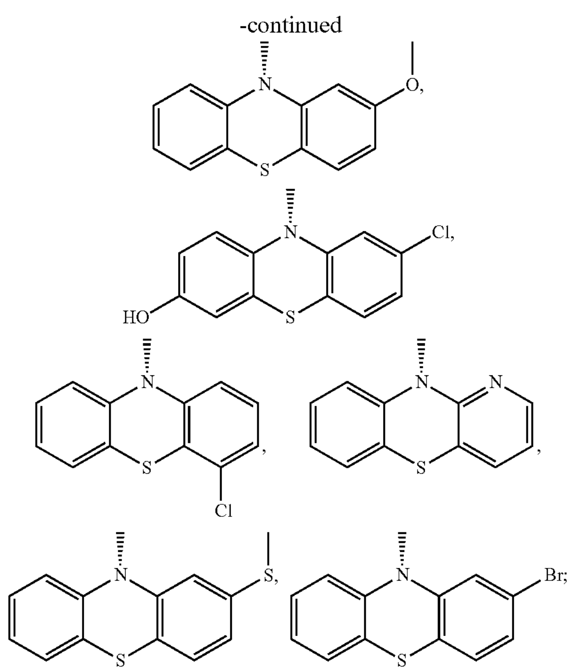

in the above structural formulas, $R_1$, $R_2$, $R_3$, $R_4$, $R_5$, and $R_6$ are H, alkyl, alkoxy, amino, halogen, or nitryl, and preferably, $R_1$, $R_2$, $R_3$, $R_4$, $R_5$, and $R_6$ are one of —H, —$CH_3$, —$CH_2CH_3$, —$CH(CH_3)_2$, —$C(CH_3)_3$, —F, —Cl, —Br, —I, —$NO_2$, —$OCH_3$, or —$OCH_2CH_3$; $R_1$, $R_2$, $R_3$, $R_4$, $R_5$, and $R_6$ are the same or different.

The present invention provides a method for preparing a catalyst for synthesizing a cyclic carbonate, including the following steps:

1) under the protection of nitrogen, dissolving a diamine compound X and a salicylaldehyde-containing compound into an organic solvent A, adding a metal source M, and adding an organic acid B as a catalyst, and heating for reflux reaction; and 2) adding a phenothiazine compound Y to continue the reaction, and conducting separation and purification to obtain the catalyst for synthesizing a cyclic carbonate.

The heating for reflux reaction in the step 1) refers to heating at 20-80° C. for reflux reaction for 1-12 h;

the diamine compound X, the salicylaldehyde-containing compound, the metal source M, the organic acid B, and the phenothiazine compound Y have a molar ratio of 1:2:1:0.0001-0.02:1-1.5;

the diamine compound X and the organic solvent A in the step 1) have a use ratio of 0.25-0.40 mol/L.

In the step 1), the diamine compound X may be: one of o-phenylenediamine, cyclohexanediamine, ethylenediamine, 1,2-propanediamine, 2,3-butanediamine, 1,2-butanediamine, diphenylethylenediamine, monophenyl ethylenediamine, substituent-containing o-phenylenediamine, or substituent-containing cyclohexanediamine, and the substituent is —H, —$CH_3$, —$CH_2CH_3$, —$CH(CH_3)_2$, —$C(CH_3)_3$, —F, —Cl, —Br, —I, —$NO_2$, —$OCH_3$, or —$OCH_2CH_3$.

The salicylaldehyde-containing compound has a structural formula of:

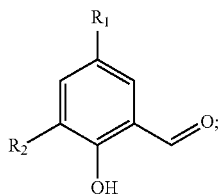

$R_1$ and $R_2$ in the structural formula are selected from —H, —$CH_3$, —$CH_2CH_3$, —$CH(CH_3)_2$, —$C(CH_3)_3$, —F, —Cl, —Br, —I, —$NO_2$, —$OCH_3$, or —$OCH_2CH_3$; and $R_1$ and $R_2$ are the same or different.

The organic solvent A is selected from a combination of one or more of: methanol, ethanol, acetonitrile, toluene, dichloromethane, acetone, dimethylformamide, cyclohexane, butanone, or diethyl ether.

The metal source M is selected from: a combination of one or more of $Al^{3+}$, $Zn^{2+}$, $Fe^{3+}$, $Co^{2+}$, $Mn^{2+}$, $Ni^{2+}$, $Mg^{2+}$, $Cr^{3+}$, or $Ca^{2+}$.

The organic acid B is selected from: a combination of one or more of formic acid, acetic acid, propionic acid, butyric acid, ethanedioic acid, butanedioic acid, maleic acid, tartaric acid, benzoic acid, or oxalic acid.

In the step 2), the phenothiazine compound Y is added for continuous reaction for 1-12 h.

The phenothiazine compound Y in the step 2) may be: a combination of one or more of phenothiazine, 2-(trifluoromethyl) phenothiazine, 2-acetyl phenothiazine, 2-cyanophenothiazine, 2-methoxycyanophenothiazine, 2-chloro-7-hydroxycyanophenothiazine, 4-chlorocyanophenothiazine, azophenolthiazide, 2-methylthiophenothiazine, or 2-bromophenothiazine.

The separation and purification in the step 2) are specifically as follows: at the end of the reaction, the reaction system is cooled to room temperature, and the organic solvent A is removed via distillation under reduced pressure, and then the obtained product is dried and recrystallized in a hot organic solvent C to obtain the catalyst for synthesizing a cyclic carbonate.

The major synthetic process of the catalyst for synthesizing a cyclic carbonate is as follows:

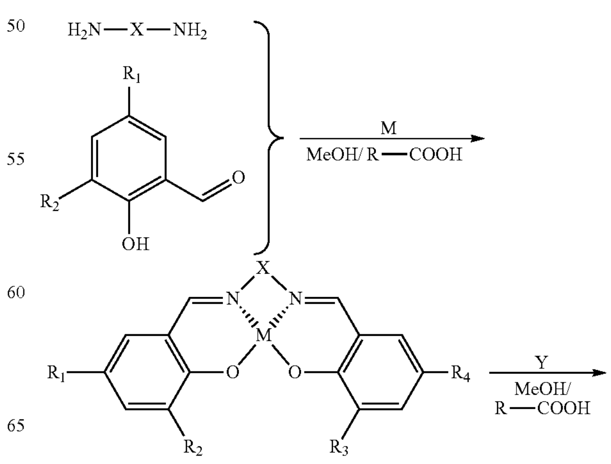

-continued

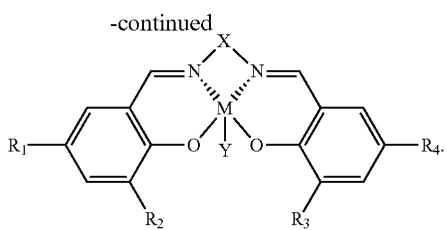

The major anti-self-polymerization mechanism of the catalyst for synthesizing a cyclic carbonate is as follows:

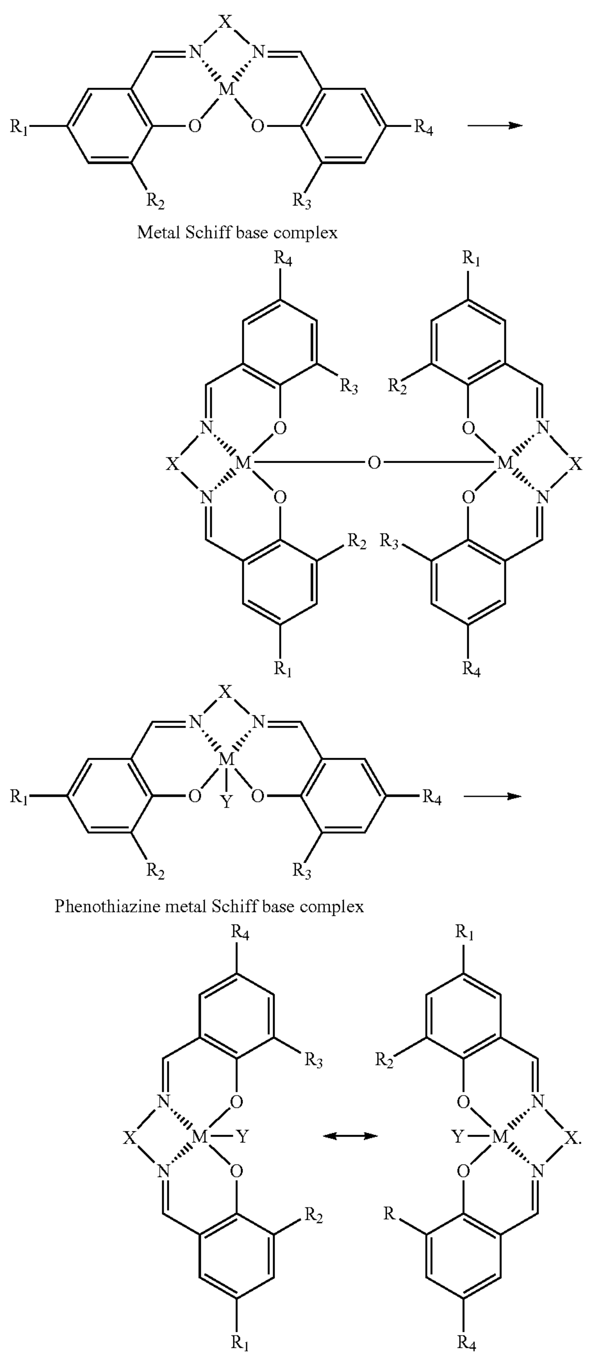

The phenothiazine metal Schiff base catalyst provided in the present invention is to modify the active center of a metal Schiff base catalyst via a phenothiazine compound; the phenothiazine compound and a central metal make up phenothiazine free radicals, thus constituting the phenothiazine metal Schiff base catalyst; alternatively, the phenothiazine metal Schiff base catalyst and a cocatalyst constitute a binary catalyst system. The phenothiazine compound and the central metal make up phenothiazine free radicals (the structure of phenothiazine contains two benzene rings, and the presence of benzene ring enables the density of electron cloud on the N atom to increase, it is thus very prone to close to the electron-deficient metal center, thus forming phenothiazine free radicals), which can protect the central metal in the course of reaction and inhibit self-polymerization of the central metal, thus avoiding its inactivation due to self-polymerization. Moreover, the above course can efficiently catalyze carbon dioxide and an epoxide to synthesize a cyclic carbonate under mild conditions.

The present invention provides use of a catalyst for synthesizing a cyclic carbonate in catalyzing carbon dioxide and an epoxide to synthesize a cyclic carbonate.

The specific use method is as follows:

mixing the above prepared catalyst for synthesizing a cyclic carbonate with a cocatalyst in a high pressure reactor, replacing air in the reactor with carbon dioxide, introducing carbon dioxide after adding the epoxide, stirring and heating up for reaction, at the end of the reaction, stopping the stirring, cooling to room temperature, emptying unreacted carbon dioxide, and isolating reactor liquid via distillation under reduced pressure to obtain a product cyclic carbonate.

In the step of introducing carbon dioxide, the reaction system is maintained at a pressure of 0.1-5.0 MPa, stirred and heated up to 20-180° C. for reaction for 1-72 h.

The molar ratio of the integral molar quantity of the catalyst for synthesizing a cyclic carbonate and the cocatalyst to the molar quantity of the epoxide is 1:500-1:500,000;

the catalyst for synthesizing a cyclic carbonate and the cocatalyst have a molar ratio of 1:1-1:100.

The cocatalyst is tetrabutylammonium bromide; and the epoxide is ethylene oxide.

According to the present invention, the formation of phenothiazine free radicals by phenothiazine compound groups with a central metal of metal Schiff base can protect the central metal in the synthesis of the cyclic carbonate and inhibit self-polymerization of the central metal to avoid its inactivation due to self-polymerization, thus improving the stability of the catalyst and improving the activity of the catalyst. The phenothiazine compound of the present invention can be present as a polymerization inhibitor to inhibit the generation of by-products such as polycarbonates and polyethylene glycol during the reaction, thereby enhancing the selectivity of the catalyst. Moreover, the phenothiazine compound is alkaline and can adsorb and activate carbon dioxide during the reaction, which helps to improve the reaction efficiency. The phenothiazine metal Schiff base catalyst in the present invention has high activity, good selectivity, and strong stability and thus, can achieve the efficient catalyzed synthesis of cyclic carbonates under mild conditions, suitable for industrial promotion.

DESCRIPTION OF THE EMBODIMENTS

To make the objectives, technical solutions and advantages of the examples of the present invention clearer, the technical solutions in the examples of the present invention will be described with reference to the examples of the present invention clearly and completely. Obviously, the described examples are a portion of examples in the present invention instead of all the examples. Based on the examples of the present invention, all the other examples obtained by those skilled in the art without any inventive effort fall within the protection scope of the present invention.

Test materials, reagents and the like used in the following examples may be all commercially available, unless otherwise specified.

Comparative Example 1

A method for preparing a catalyst for synthesizing a cyclic carbonate, includes the following steps:

1) Under the protection of nitrogen, 1 mol o-phenylenediamine and 2 mol 3,5-di-tert-butyl salicylaldehyde were dissolved into 3 L methanol, 1 mol zinc acetate was added, and then 0.02 mol acetic acid was added as a catalyst, and heated for reflux reaction for 1 h at 80° C.

2) At the end of the reaction, the reaction system was cooled to room temperature, and methanol was removed via distillation under reduced pressure, and then the obtained product was dried and recrystallized in a hot acetonitrile to obtain the catalyst for synthesizing a cyclic carbonate.

The structure of the catalyst for synthesizing a cyclic carbonate is as follows:

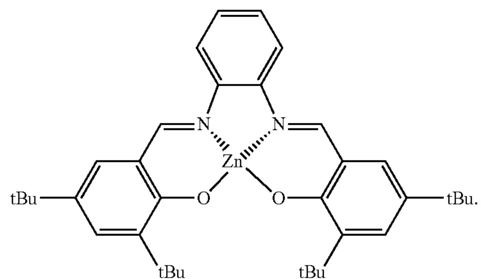

Example 1

A method for preparing a catalyst for synthesizing a cyclic carbonate, includes the following steps:

1) Under the protection of nitrogen, 1 mol o-phenylenediamine and 2 mol 3,5-di-tert-butyl salicylaldehyde were dissolved into 3 L methanol, 1 mol zinc acetate was added, and then 0.02 mol acetic acid was added as a catalyst, and heated for reflux reaction for 1 h at 80° C., and then 1 mol phenothiazine was added to continue the reaction for 1 h.

2) At the end of the reaction, the reaction system was cooled to room temperature, and methanol was removed via distillation under reduced pressure, and then the obtained product was dried and recrystallized in a hot acetonitrile to obtain the catalyst for synthesizing a cyclic carbonate.

The structure of the catalyst for synthesizing a cyclic carbonate is as follows:

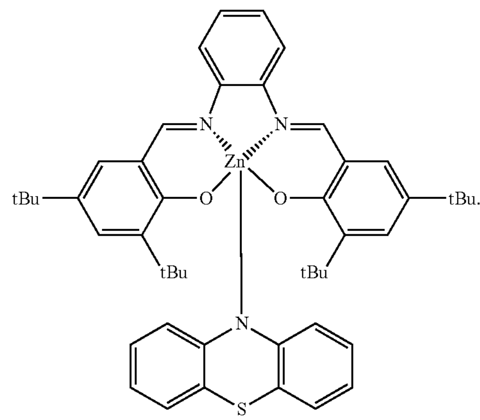

Example 2

A method for preparing a catalyst for synthesizing a cyclic carbonate, includes the following steps:

1) Under the protection of nitrogen, 1 mol o-phenylenediamine and 2 mol 3,5-dibromo-salicylaldehyde were dissolved into 3 L methanol, 1 mol zinc acetate was added, and then 0.001 mol formic acid was added as a catalyst, and heated for reflux reaction for 6 h at 50° C., and then 1.1 mol phenothiazine was added to continue the reaction for 6 h.

2) At the end of the reaction, the reaction system was cooled to room temperature, and ethanol was removed via distillation under reduced pressure, and then the obtained product was dried and recrystallized in a hot cyclohexane to obtain the catalyst for synthesizing a cyclic carbonate.

The structure of the catalyst for synthesizing a cyclic carbonate is as follows:

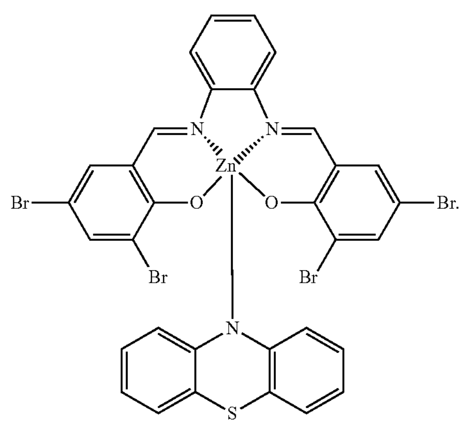

Example 3

A method for preparing a catalyst for synthesizing a cyclic carbonate, includes the following steps:

1) Under the protection of nitrogen, 1 mol diphenylethylenediamine and 2 mol salicylaldehyde were dissolved into 3 L dichloromethane, 1 mol manganese acetate was added, and then 0.0001 mol oxalic acid was added as a catalyst, and heated for reflux reaction for 12 h at 20° C., and then 1 mol 2-(trifluoromethyl) phenothiazine was added to continue the reaction for 12 h.

2) At the end of the reaction, the reaction system was cooled to room temperature, and dichloromethane was removed via distillation under reduced pressure, and then the obtained product was dried and recrystallized in a hot acetonitrile to obtain the catalyst for synthesizing a cyclic carbonate.

The structure of the catalyst for synthesizing a cyclic carbonate is as follows:

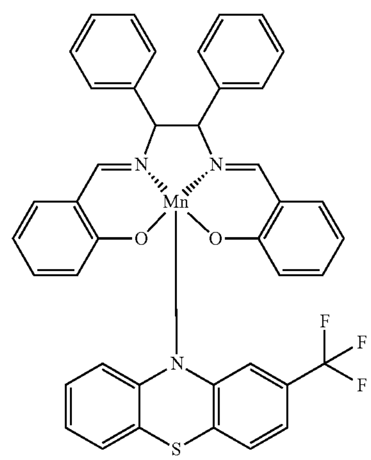

Example 4

A method for preparing a catalyst for synthesizing a cyclic carbonate, includes the following steps:

1) Under the protection of nitrogen, 1 mol 1,2-cyclohexanediamine and 2 mol 3,5-di-tert-butyl salicylaldehyde were dissolved into 3 L methanol, 1 mol zinc acetate was added, and then 0.003 mol oxalic acid was added as a catalyst, and heated for reflux reaction for 6 h at 50° C., and then 1.3 mol phenothiazine was added to continue the reaction for 6 h.

2) At the end of the reaction, the reaction system was cooled to room temperature, and methanol was removed via distillation under reduced pressure, and then the obtained product was dried and recrystallized in a hot acetonitrile to obtain the catalyst for synthesizing a cyclic carbonate.

The structure of the catalyst for synthesizing a cyclic carbonate is as follows:

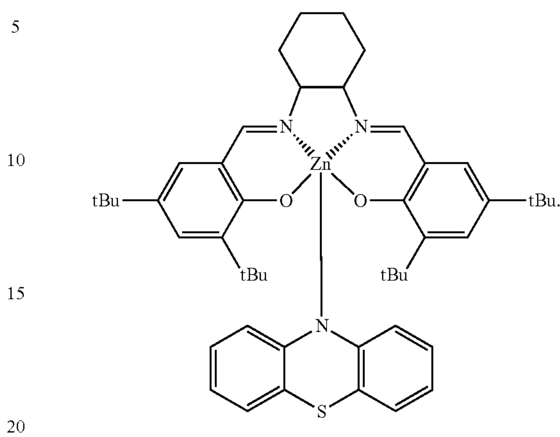

Example 5

A method for preparing a catalyst for synthesizing a cyclic carbonate, includes the following steps:

1) Under the protection of nitrogen, 1 mol ethylenediamine and 2 mol 3-fluoro-salicylaldehyde were dissolved into 3 L toluene, 1 mol nickel acetate was added, and then 0.005 mol benzoic acid was added as a catalyst, and heated for reflux reaction for 12 h at 60° C., and then 1.1 mol 2-acetyl phenothiazine was added to continue the reaction for 12 h.

2) At the end of the reaction, the reaction system was cooled to room temperature, and toluene was removed via distillation under reduced pressure, and then the obtained product was dried and recrystallized in a hot acetonitrile to obtain the catalyst for synthesizing a cyclic carbonate.

The structure of the catalyst for synthesizing a cyclic carbonate is as follows:

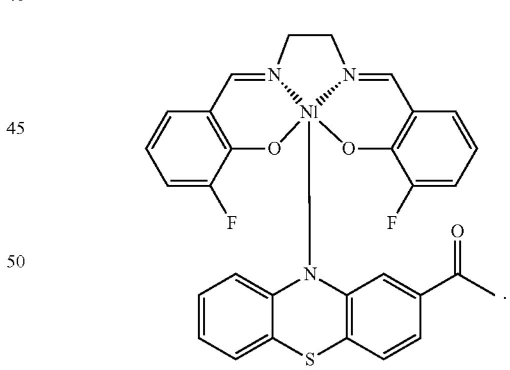

Example 6

A method for preparing a catalyst for synthesizing a cyclic carbonate, includes the following steps:

1) Under the protection of nitrogen, 1 mol 4-bromo-o-phenylenediamine and 2 mol 3,5-di-tert-butyl salicylaldehyde were dissolved into 3 L acetone, 1 mol zinc acetate was added, and then 0.004 mol tartaric acid was added as a catalyst, and heated for reflux reaction for 12 h at 80° C., and then 1.5 mol 2-bromophenothiazine were added to continue the reaction for 12 h.

2) At the end of the reaction, the reaction system was cooled to room temperature, and acetone was removed via distillation under reduced pressure, and then the obtained product was dried and recrystallized in a hot acetonitrile to obtain the catalyst for synthesizing a cyclic carbonate.

The structure of the catalyst for synthesizing a cyclic carbonate is as follows:

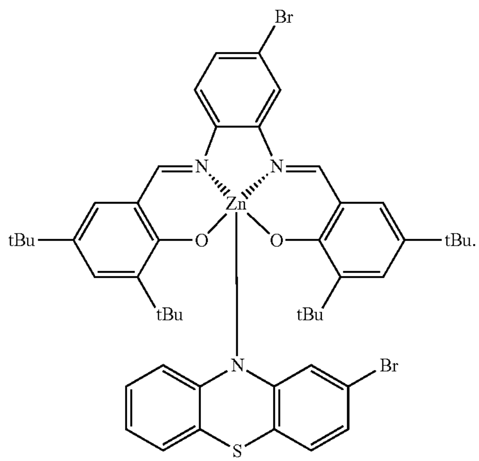

Example 7

A method for preparing a catalyst for synthesizing a cyclic carbonate, includes the following steps:

1) Under the protection of nitrogen, 1 mol 2,3-butanediamine and 2 mol 3-methyl-salicylaldehyde were dissolved into 3 L dichloromethane, 1 mol chromic chloride was added, and then 0.006 mol butanedioic acid was added as a catalyst, and heated for reflux reaction for 8 h at 70° C., and then 1 mol 4-chlorophenothiazine was added to continue the reaction for 8 h.

2) At the end of the reaction, the reaction system was cooled to room temperature, and dichloromethane was removed via distillation under reduced pressure, and then the obtained product was dried and recrystallized in a hot ethanol to obtain the catalyst for synthesizing a cyclic carbonate.

The structure of the catalyst for synthesizing a cyclic carbonate is as follows:

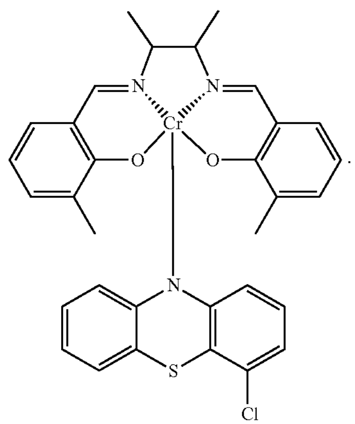

Example 8

A method for preparing a catalyst for synthesizing a cyclic carbonate, includes the following steps:

1) Under the protection of nitrogen, 1 mol monophenyl ethylenediamine and 2 mol 3,5-di-tert-butyl salicylaldehyde were dissolved into 3 L methanol, 1 mol diethyl aluminum chloride was added, and then 0.002 mol propionic acid was added as a catalyst, and heated for reflux reaction for 10 h at 65° C., and then 1.1 mol azophenolthiazide was added to continue the reaction for 8 h.

2) At the end of the reaction, the reaction system was cooled to room temperature, and methanol was removed via distillation under reduced pressure, and then the obtained product was dried and recrystallized in a hot acetonitrile to obtain the catalyst for synthesizing a cyclic carbonate.

The structure of the catalyst for synthesizing a cyclic carbonate is as follows:

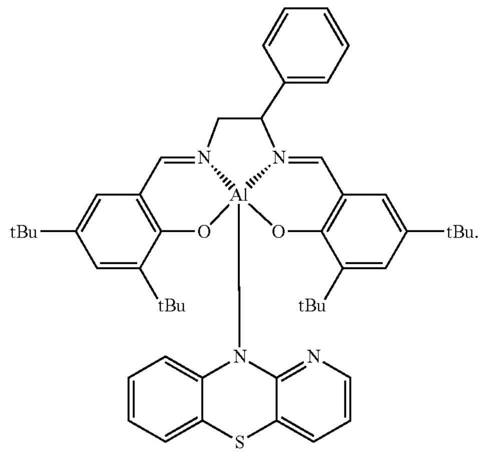

Example 9

A method for preparing a catalyst for synthesizing a cyclic carbonate, includes the following steps:

1) Under the protection of nitrogen, 1 mol o-phenylenediamine and 2 mol 3,5-di-tert-butyl salicylaldehyde were dissolved into 3 L methanol, 1 mol ferric chloride was added, and then 0.001 mol formic acid was added as a catalyst, and heated for reflux reaction for 6 h at 70° C., and then 1 mol phenothiazine was added to continue the reaction for 6 h.

2) At the end of the reaction, the reaction system was cooled to room temperature, and methanol was removed via distillation under reduced pressure, and then the obtained product was dried and recrystallized in a hot acetonitrile to obtain the catalyst for synthesizing a cyclic carbonate.

The structure of the catalyst for synthesizing a cyclic carbonate is as follows:

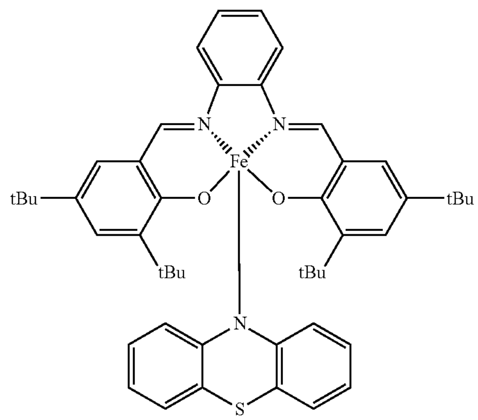

Example 10

A method for preparing a catalyst for synthesizing a cyclic carbonate, includes the following steps:

1) Under the protection of nitrogen, 1 mol 1,2-butanediamine and 2 mol 5-chloro-3-nitrosalicylaldehyde were dissolved into 3 L dimethylformamide, 1 mol cobalt acetate was added, and then 0.001 mol butyric acid was added as a catalyst, and heated for reflux reaction for 8 h at 70° C., and then 1 mol 2-methylthiophenothiazine was added to continue the reaction for 8 h.

2) At the end of the reaction, the reaction system was cooled to room temperature, and dimethylformamide was removed via distillation under reduced pressure, and then the obtained product was dried and recrystallized in a hot acetonitrile to obtain the catalyst for synthesizing a cyclic carbonate.

The structure of the catalyst for synthesizing a cyclic carbonate is as follows:

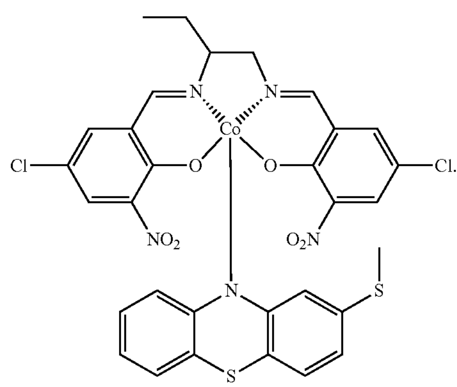

Example 11

A method for preparing a catalyst for synthesizing a cyclic carbonate, includes the following steps:

1) Under the protection of nitrogen, 1 mol 1,2-propanediamine and 2 mol 3,5-dinitrosalicylaldehyde were dissolved into 3 L diethyl ether, 1 mol magnesium acetate was added, and then 0.01 mol propionic acid was added as a catalyst, and heated for reflux reaction for 12 h at 65° C., and then 1 mol 2-chloro-7-hydroxyphenothiazine was added to continue the reaction for 12 h.

2) At the end of the reaction, the reaction system was cooled to room temperature, and diethyl ether was removed via distillation under reduced pressure, and then the obtained product was dried and recrystallized in a hot cyclohexane to obtain the catalyst for synthesizing a cyclic carbonate.

The structure of the catalyst for synthesizing a cyclic carbonate is as follows:

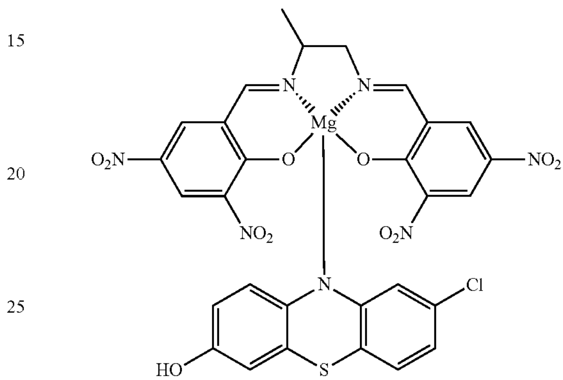

Example 12

A method for preparing a catalyst for synthesizing a cyclic carbonate, includes the following steps:

1) Under the protection of nitrogen, 1 mol o-phenylenediamine and 2 mol 3,5-di-tert-butyl salicylaldehyde were dissolved into 3 L methanol, 1 mol calcium nitrate was added, and then 0.003 mol formic acid was added as a catalyst, and heated for reflux reaction for 2 h at 80° C., and then 1.4 mol phenothiazine was added to continue the reaction for 2 h.

2) At the end of the reaction, the reaction system was cooled to room temperature, and methanol was removed via distillation under reduced pressure, and then the obtained product was dried and recrystallized in a hot ethanol to obtain the catalyst for synthesizing a cyclic carbonate.

The structure of the catalyst for synthesizing a cyclic carbonate is as follows:

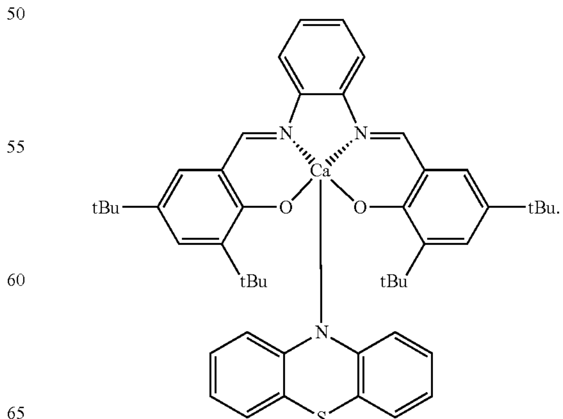

Example 13

Provided is use of a catalyst for synthesizing a cyclic carbonate, in catalyzing carbon dioxide and an epoxide to synthesize a cyclic carbonate. The specific experimental process is as follows:

1. Performance Test on the Catalyst for Synthesizing a Cyclic Carbonate:

The catalyst samples obtained in Examples 1-12 and Comparative Example 1 were subjected to the performance test on the catalyst for synthesizing a cyclic carbonate by the following method for evaluating performance of catalysts. The results are shown in Table 1.

0.001 mol of the catalysts prepared in Examples 1-12 and Comparative Example 1 and 0.001 mol tetrabutylammonium bromide were added to a 1 L high pressure reactor with a mechanical stirring device and a temperature control heating device, respectively; air in the reactor was replaced by carbon dioxide, and after 400 g ethylene oxide was added, carbon dioxide was continuously introduced to maintain the pressure of the reaction system to be 1.0 MPa; the reaction system was stirred and heated up to 130° C., 3 h later after the reaction, stirring was stopped, and the reaction system was cooled to room temperature, and unreacted carbon dioxide was emptied, then the reaction liquid was isolated via distillation under reduced pressure to obtain the product ethylene carbonate. Qualitative analysis was conducted by GC-MS (HP6890/5973) and quantitative analysis was completed by GC(GC-112A).

TABLE 1

Catalytic performance of the different samples from each Example and Comparative Example to synthesize a cyclic carbonate

| Sample | Conversion rate (%) | Selectivity (%) | Yield (%) |
|---|---|---|---|
| Comparative Example 1 | 80.0 | 98.1 | 78.5 |
| Example 1 | 90.0 | 99.5 | 89.6 |
| Example 2 | 95.0 | 99.5 | 94.5 |
| Example 3 | 88.0 | 99.3 | 86.3 |
| Example 4 | 83.0 | 99.4 | 82.5 |
| Example 5 | 86.0 | 99.2 | 85.3 |
| Example 6 | 97.0 | 99.5 | 96.5 |
| Example 7 | 91.2 | 99.6 | 90.8 |
| Example 8 | 81.0 | 99.3 | 80.4 |
| Example 9 | 87.0 | 99.2 | 86.3 |
| Example 10 | 82.1 | 99.5 | 81.6 |
| Example 11 | 85.2 | 99.4 | 84.6 |
| Example 12 | 84.3 | 99.2 | 83.6 |

2. Repeatability Test on the Catalyst for Synthesizing a Cyclic Carbonate

According to the catalytic experiment of the test sample, after the product cyclic carbonate was isolated by distillation under reduced pressure, the catalyst after reaction was collected; under the same test conditions, the samples in Example 1 and Comparative Example 1 were subjected to the repeatability test for 3 times. The test results are shown in Table 2.

TABLE 2

Repeatability of the different samples to synthesize a cyclic carbonate

| Sample | Conversion rate (%) | Selectivity (%) | Yield (%) |
|---|---|---|---|
| Comparative Example 1 | 80.0 | 98.1 | 78.5 |
| Comparative Example 1 Repetition-1 | 78.2 | 98.1 | 76.7 |
| Comparative Example 1 Repetition-2 | 75.3 | 97.3 | 73.3 |
| Comparative Example 1 Repetition-3 | 70.1 | 96.8 | 67.9 |
| Example 1 | 90.0 | 99.5 | 89.6 |
| Example 1 Repetition-1 | 89.9 | 99.5 | 89.5 |
| Example 1 Repetition-2 | 90.1 | 99.4 | 89.6 |
| Example 1 Repetition-3 | 90.0 | 99.5 | 89.6 |

As can be seen from the comparison of test results of the samples between Example 1 and Comparative Example 1, compared to the sample in the comparative example not modified with phenothiazine, the sample in the phenothiazine-modified Example 1 has better catalyst activity and stability, and may be reused repeatedly; Moreover, after 3 cycles of the catalyst, the catalyst activity maintains about 90% and the selectivity maintains about 99.5%. This is mainly because the formulation of phenothiazine free radicals via the phenothiazine group and the central active metal may protect the central metal in the course of the reaction to avoid its inactivation due to self-polymerization and to enhance the stability of the catalyst, thereby improving the activity of the catalyst.

What is described in the above examples is convenient for those skilled in the art to understand and use the present invention. Those skilled in the art obviously can readily make various amendments to these examples, and can apply the general principle specified here to other examples without any inventive efforts. Therefore, the present invention is not limited to the above examples. According to the disclosure of the present invention, any improvement and amendment made by those skilled in the art not departing from the scope of the present invention shall fall within the protection scope of the present invention.

What is claimed is:

1. A catalyst for synthesizing an ethylene carbonate, having a structural formula of:

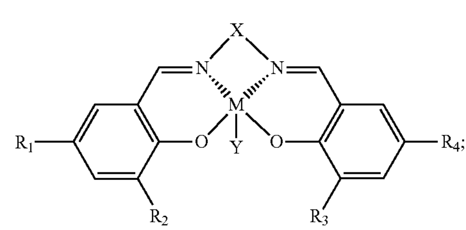

in the formula, Mis a metal ion;

X is one of the following structures:

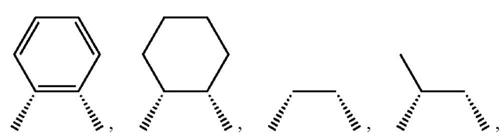

-continued

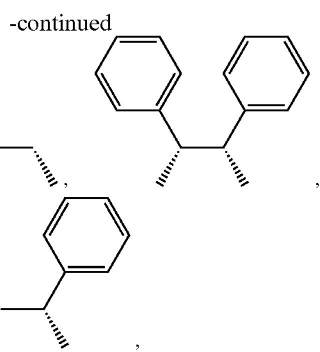

the ⁄ represents connection bounding to N atoms

Y is a phenothiazine structure;

$R_1$, $R_2$, $R_3$, and $R_4$ are H, alkyl, halogen, or nitryl;

wherein $R_1=R_4$, $R_2=R_3$.

2. The catalyst for synthesizing an ethylene carbonate according to claim 1, wherein Y is one or more of the following structural formulas:

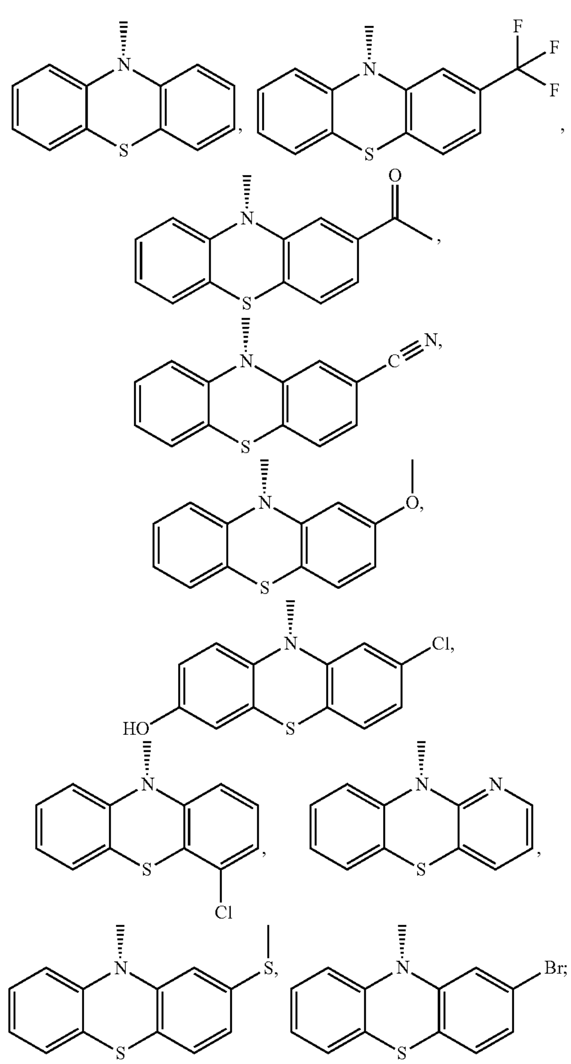

the ⁄ represents connection bounding to N atoms.

3. A method for preparing the catalyst for synthesizing an ethylene carbonate according to claim 1, comprising the following steps:

1) under the protection of nitrogen, dissolving a diamine compound and a salicylaldehyde-containing compound into an organic solvent, adding a metal source, and adding an organic acid as a catalyst, and heating for reflux reaction; and
2) adding a phenothiazine compound to continue the reaction, and conducting separation and purification to obtain the catalyst for synthesizing the ethylene carbonate;

wherein the metal source is selected from one of $Al^{3+}$, $Zn^{2+}$, $Fe^{3+}$, $Co^{2+}$, $Mn^{2+}$, $Ni^{2+}$, $Mg^{2+}$, $Cr^{3+}$, or $Ca^{2+}$.

4. The preparation method according to claim 3, wherein the diamine compound, the salicylaldehyde-containing compound, the metal source, the organic acid, and the phenothiazine compound have a molar ratio of 1:2:1:0.0001-0.02:1-1.5.

5. The preparation method according to claim 3, wherein the salicylaldehyde-containing compound has a structural formula of:

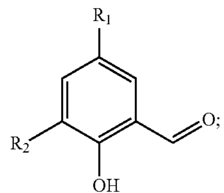

$R_1$ and $R_2$ in the structural formula are selected from —H, —$CH_3$, —$C(CH_3)_3$, —F, —Cl, —Br, —$NO_2$; and $R_1$ and $R_2$ are the same or different.

6. The preparation method according to claim 3, wherein the organic acid is selected from formic acid, acetic acid, propionic acid, butyric acid, ethanedioic acid, butanedioic acid, tartaric acid, benzoic acid, or oxalic acid.

7. The preparation method according to claim 3, wherein in the step 2), the phenothiazine compound is added to continue the reaction for 1-12 h.

8. A method of making an ethylene carbonate with the catalyst according to claim 1, comprising the following steps:

1) mixing the catalyst for synthesizing the ethylene carbonate with a quaternary ammonium salt cocatalyst in a high-pressure reactor, replacing air in the reactor with carbon dioxide, the molar ratio of the integral molar quantity of the catalyst for synthesizing the ethylene carbonate and the quaternary ammonium salt cocatalyst to the molar quantity of ethylene oxide is 1:500-1:500,000;

introducing carbon dioxide after adding the ethylene oxide, the reaction system is maintained at a pressure of 0.1-5.0 MPa, stirred and heated up to 20-180° C. for reaction for 1-72 h;

2) stopping the stirring, cooling to room temperature, emptying unreacted carbon dioxide, and isolating reactor liquid via distillation under reduced pressure to obtain a ethylene carbonate product.

9. The method according to claim 8, wherein the quaternary ammonium salt cocatalyst is tetrabutylammonium bromide, the catalyst for synthesizing the ethylene carbonate and the quaternary ammonium salt cocatalyst have a molar ratio of 1:1-1:100.

* * * * *